United States Patent
Kondo et al.

(10) Patent No.: US 7,137,652 B2
(45) Date of Patent: Nov. 21, 2006

(54) PIPE JOINT STRUCTURE AND METHOD OF ASSEMBLING SAME

(75) Inventors: Jun Kondo, Gamagori (JP); Tadashi Nishiwaki, Kariya (JP)

(73) Assignee: Denso Corporation, Kariya (JP)

( * ) Notice: Subject to any disclaimer, the term of this patent is extended or adjusted under 35 U.S.C. 154(b) by 198 days.

(21) Appl. No.: 10/816,937

(22) Filed: Apr. 5, 2004

(65) Prior Publication Data

US 2004/0195837 A1    Oct. 7, 2004

(30) Foreign Application Priority Data

| Apr. 7, 2003 | (JP) | ............................. 2003-103129 |
| May 28, 2003 | (JP) | ............................. 2003-151217 |
| Feb. 27, 2004 | (JP) | ............................. 2004-054842 |

(51) Int. Cl.
*F16L 41/00* (2006.01)
*F16L 5/00* (2006.01)
*F02M 69/46* (2006.01)

(52) U.S. Cl. ............... 285/189; 285/143.1; 285/384; 285/386; 123/456

(58) Field of Classification Search ............ 285/189, 285/197, 143.1, 141.1, 384, 386, 288.1, 288.5, 285/288.6; 123/456, 468
See application file for complete search history.

(56) References Cited

U.S. PATENT DOCUMENTS

| 3,799,189 | A | * | 3/1974 | Christianson | ............... 137/316 |
| 4,919,461 | A | * | 4/1990 | Reynolds | ............... 285/148.13 |
| 5,033,435 | A | * | 7/1991 | Ostarello et al. | ............ 123/469 |
| 5,120,084 | A | * | 6/1992 | Hashimoto | ............. 285/133.11 |
| 5,169,182 | A | * | 12/1992 | Hashimoto | ............... 285/332.2 |
| 5,326,139 | A | * | 7/1994 | Corcoran | ................... 285/197 |
| 5,775,302 | A | | 7/1998 | Guido et al. | |
| 5,887,910 | A | * | 3/1999 | Usui | ..................... 285/288.1 |
| 5,957,507 | A | | 9/1999 | Asada | |
| 6,609,502 | B1 | | 8/2003 | Frank | |
| 6,698,801 | B1 | * | 3/2004 | Boecking | ................. 285/288.1 |
| 6,736,431 | B1 | * | 5/2004 | Jung et al. | ............... 285/288.1 |
| 2003/0127852 | A1 | * | 7/2003 | Usui | ...................... 285/125.1 |
| 2004/0089268 | A1 | * | 5/2004 | Brenk et al. | ................ 123/446 |
| 2004/0094127 | A1 | * | 5/2004 | Watanabe | .................... 123/447 |
| 2005/0098159 | A1 | * | 5/2005 | Nishiwaki | ................... 123/468 |
| 2005/0146134 | A1 | * | 7/2005 | Usui | .......................... 285/192 |

FOREIGN PATENT DOCUMENTS

JP        10-259772        9/1998

OTHER PUBLICATIONS

Patent Abstracts of Japan, vol. 2000, No. 20, Jul. 10, 2001 & JP 2001 082663 A (Usui Internatl Ind Co. Ltd), Mar. 30, 2001.

(Continued)

*Primary Examiner*—James M. Hewitt
(74) *Attorney, Agent, or Firm*—Nixon & Vanderhye P.C.

(57) ABSTRACT

In a pipe joint structure, a second screw thread formed on an outer circumference end of a joint member is screwed deep into a first screw thread formed on an inner circumference of a cylindrical joint fitting member whose axial end is bonded to a common rail body so that a second flat surface at an axial end of the joint member is pressed against a first flat surface on an outer circumference of the common rail body to form a fluid tight sealing surface therebetween in a state that a fluid passage opened to the second flat surface communicates with a through-hole opened to the first flat surface. Accordingly, even if a position of the joint fitting member to the common rail body is slightly shifted, fluid tight sealing between the first and second flat surfaces is assured.

12 Claims, 13 Drawing Sheets

OTHER PUBLICATIONS

Patent Abstracts of Japan, vol. 1999, No. 13, Nov. 30, 1999, & JP 11 230438 A (Usui Internatl Ind Co Ltd), Aug. 27, 1999.

Patent Abstracts of Japan, vol. 2000, No. 20, Jul. 10, 2001 & JP 2001 082664 A (Usui Internatl Ind Co Ltd), Mar. 30, 2001.

* cited by examiner

<u>PRIOR ART</u>

PIPE JOINT STRUCTURE AND METHOD OF ASSEMBLING SAME

CROSS REFERENCE TO RELATED APPLICATIONS

This application is based upon and claims the benefit of priority of Japanese Patent Applications No. 2003-103129 filed on Apr. 7, 2003, No. 2003-151217 filed on May 28, 2003 and No., 2004-54842 filed on Feb. 27, 2004, the contents of which are incorporated herein by reference.

BACKGROUND OF THE INVENTION

1. Field of the Invention

The present invention relates to a pipe joint structure or a method of assembling main parts of the pipe joint structure in which a distribution pipe is joined to a vessel for accumulating fluid, in particular, applicable to a pipe joint structure including a vessel for accumulating high pressure fluid such as a common rail body in a common rail type fuel injection system.

2. Description of Related Art

It is known that a pipe joint structure in which a distribution pipe (such as a distribution pipe for a high pressure pump or a distribution pipe for an injector) is joined to a common rail body J1 for accumulating high pressure fuel, as shown in FIGS. 14 to 16 wherein analogous structures are depicted and labeled with common reference characters. In the pipe joint structure shown in FIGS. 14 to 16, the common rail body J1 is provided with a conical shaped pressure receiving seat J2. A conical portion J4 formed at an axial end of a distribution pipe J3 (refer to FIG. 14 and FIG. 16) or a conical portion J6 formed at an axial end of a distribution pipe extension cylinder J5 (refer to FIG. 15) is pressed against the pressure receiving seat J2 of the common rail body J1. A contact surface between the pressure receiving seat J2 and the conical portion J4 or J6 constitutes a fluid tight sealing surface J7.

A cylindrical screw threaded joint fitting J8 is fixed by welding to the common rail body J1. A distributor pipe screw fastening nut J11, which is assembled in advance to the distribution pipe J3, is screwed on to a threaded surface J10 of the screw threaded joint fitting J8 in a state that the distributor pipe screw fastening nut J11 abuts against a step portion J9 at a back of the conical portion J4. By fastening the distributor pipe screw fastening nut J11 into the threaded surface J10 of the screw threaded joint fitting J8, the conical portion J4 of the distribution pipe J3 (or the conical portion J6 of the distribution pipe extension cylinder J5) is strongly pressed against the pressure receiving seat J2 of the common rail body J1 to form a main body sealing surface J7.

In the structure mentioned above, if a mounting position of the screw threaded joint fitting J8 to the common rail body J1 is shifted, it becomes very difficult to form the main body sealing surface J7 since the conical portion J4 or J6 does not coincide accurately with the pressure receiving seat J2. Accordingly, in the conventional structure, the screw threaded joint fitting J8 has to be mounted on the common rail body J1 with higher dimensional accuracy. To satisfy this requirement, dimensions of parts constituting the common rail body J1 and the screw threaded joint fitting J8 have to be highly accurate and it is necessary to use expensive welding technology such as laser welding technology, which results in higher manufacturing cost.

Further, it is preferable that the common rail body J1 is made of material having higher hardness such as middle or high carbon steel since the common rail body J1 has to endure extremely high pressure. However, though the middle or high carbon steel can be bonded by resistance welding which is not expensive, they can not be bonded by the laser welding whose welding accuracy is high. If low carbon steel is used for the common rail body J1, the laser welding is usable. However, a body size of the common rail body J1 has to be enlarged to ensure high pressure endurance.

Furthermore, in the conventional structure in which distribution pipe J3 or distribution pipe extension cylinder J5 is inserted and positioned inside screw threaded joint fitting J8, the larger size of distributor pipe screw fastening nut J11 is required. This may cause inconvenience for installation to a vehicle. If a smaller size (for example, thread size M12) of distributor pipe screw fastening nut J11 is used for easier installation, thinner wall thickness of screw threaded joint fitting J8 is required, which may cause insufficient strength of screw threaded joint fitting J8.

SUMMARY OF THE INVENTION

An object of the present invention is to provide a pipe joint structure in which a distribution pipe is fluid tightly joined to a vessel for accumulating fluid (such as a common rail body), even if a mounting position of a main part such as a screw threaded joint fitting to the vessel is shifted.

Another object of the present invention is to provide a method of easily assembling the main parts in the pipe joint structure.

To achieve the above object, a pipe joint structure is composed of a vessel, a joint fitting member, a joint member, a distribution pipe and a mounting nut. The vessel is provided at an outer circumference with a first flat surface at a circumferential wall with a through-hole having one end opened to the first flat surface and another end opened to an interior. The joint fitting member has an interior insertion hole diameter larger than the diameter of the through-hole and a first screw thread at inner circumferential wall or an outer circumferential wall. This joint fitting member is bonded to the vessel in so that the first flat surface is positioned radially inside the insertion hole and surrounds an entire outer periphery of the through-hole opened to the first flat surface. The joint member is provided with an insertion portion having (a) a second flat surface formed at an end, (b) a pipe connection portion having a conical pressure receiving seat formed at another end, and (c) a pipe mounting screw thread at an outer circumference. The insertion portion and the pipe connection portion are connected by an internal fluid passage with one end opened in the second flat surface and another end opened to the conical pressure receiving seat. The distribution pipe is provided at an end thereof with a conical portion. The mounting nut is fastened into the pipe mounting screw thread so that the conical portion is pressed against the conical receiving seat.

In the pipe joint structure mentioned above, the joint member is further provided at a position inside the inner circumferential wall of the insertion hole or a position outside the outer circumferential wall of the joint fitting member with a second screw thread screwed into the first screw thread so that the insertion portion is inserted sufficiently into the insertion hole such that the second flat surface is pressed into fluid tight contact directly or indirectly with the first flat surface while the fluid passage communicates with the through-hole.

According to the pipe joint structure mentioned above, even if a mounting position of the joint fitting member to the vessel is slightly shifted, fluid tight sealing between the first and second flat surfaces is assured, since the second flat surface is pressed against and in fluid tight surface contact with the first flat surface.

Accordingly, higher dimensional accuracy of the parts such as the joint fitting member and the vessel is not required, which results in reducing a manufacturing cost.

Further, as the joint fitting member can be bonded to the vessel by inexpensive bonding means such as resistance welding or blazing without using the expensive laser welding.

Furthermore, the joint fitting member and the vessel can be made of material having higher hardness such as middle or high carbon steel, which can be bonded to each other by in expensive bonding means such as resistance welding or blazing without using the expensive laser welding. As a result, a body size of the vessel such as the common rail body becomes more compact.

Moreover, the distributor pipe is not inserted into the interior of the joint fitting member, which allows an outer diameter of the pipe connection portion of the joint member having the pipe mounting screw thread to be smaller so that the pipe joint structure is more compact.

It is preferable that the first screw thread is a female thread formed on the inner circumferential wall of the insertion hole and the second screw thread is a male thread formed on an outer circumference of the insertion portion.

In case that the joint member is further provided outside the outer circumferential wall of the joint fitting member with a cylindrical pipe, the first screw thread may be a male thread formed on the outer circumferential wall of the joint fitting member and the second screw thread may be a female thread formed on an inner circumference of the cylindrical pipe.

If the vessel is a common rail body for accumulating high pressure fuel in a common rail type fuel injection device, the fluid passage formed in the joint member may be provided inside with an orifice, which serves to reduce fluid flow pulsation generating in the distribution pipe.

A packing plate having a packing through-hole constituting a part of the fluid passage may be disposed between the first and second flat surfaces so that the second flat surface is pressed against and in fluid tight contact with the first flat surface via the packing plate. The packing plate serves to further ensure the fluid tight sealing between the vessel and the joint member.

When the joint member is assembled to the joint fitting member, the insertion portion is inserted deep into the insertion hole until the second flat surface is pressed against and in fluid tight contact with the first flat surface by, after holding an end of the pipe connection portion and a part of the outer circumference thereof on a side of the conical pressure receiving seat, rotating the joint member relative to the joint fitting member so as to screw the second screw thread into the first screw thread.

It is preferable, in this case, to use a bolt fastening wrench having a box and a tool for rotatably driving the box. An inner surface of the box is screw fastened to the pipe mounting screw thread until an inner bottom of the box comes in contact with the end of the pipe connection portion so that the end of the pipe connection portion and the outer circumference thereof on a side of the conical pressure receiving seat is held by the box. Then, the box is turned by the tool so as to apply a rotating moment to the pipe connection portion so that the joint member is rotated relative to the joint fitting member so as to screw the second screw thread into the first screw thread.

According to the method mentioned above, it is not necessary to have a wrench engaging portion such as hexagonal nut in the joint member and the first and second screw threads can be fastened to each other in use of the wrench to be engaged directly with the pipe mounting screw thread provided in the joint member.

A part of the fluid passage positioned in the pipe connection portion immediately adjacent to the conical pressure receiving seat may be formed in hexagonal shape. In this case, the first and second screw threads can be fastened to each other in use of a wrench having a hexagonal shaped head to be engaged with the hexagonal hole.

As an alternative, the outer circumference of the pipe connection portion may be provided with a plurality of grooves spaced circumferentially at given intervals and extending axially so as to cross the pipe mounting screw thread. In this case, the first and second screw threads can be fastened to each other in use of a wrench having a plurality of projections to be inserted into the grooves of the pipe connection portion.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A first embodiment of the present invention is described with reference to FIG. 1 to 3.

Figure 3:
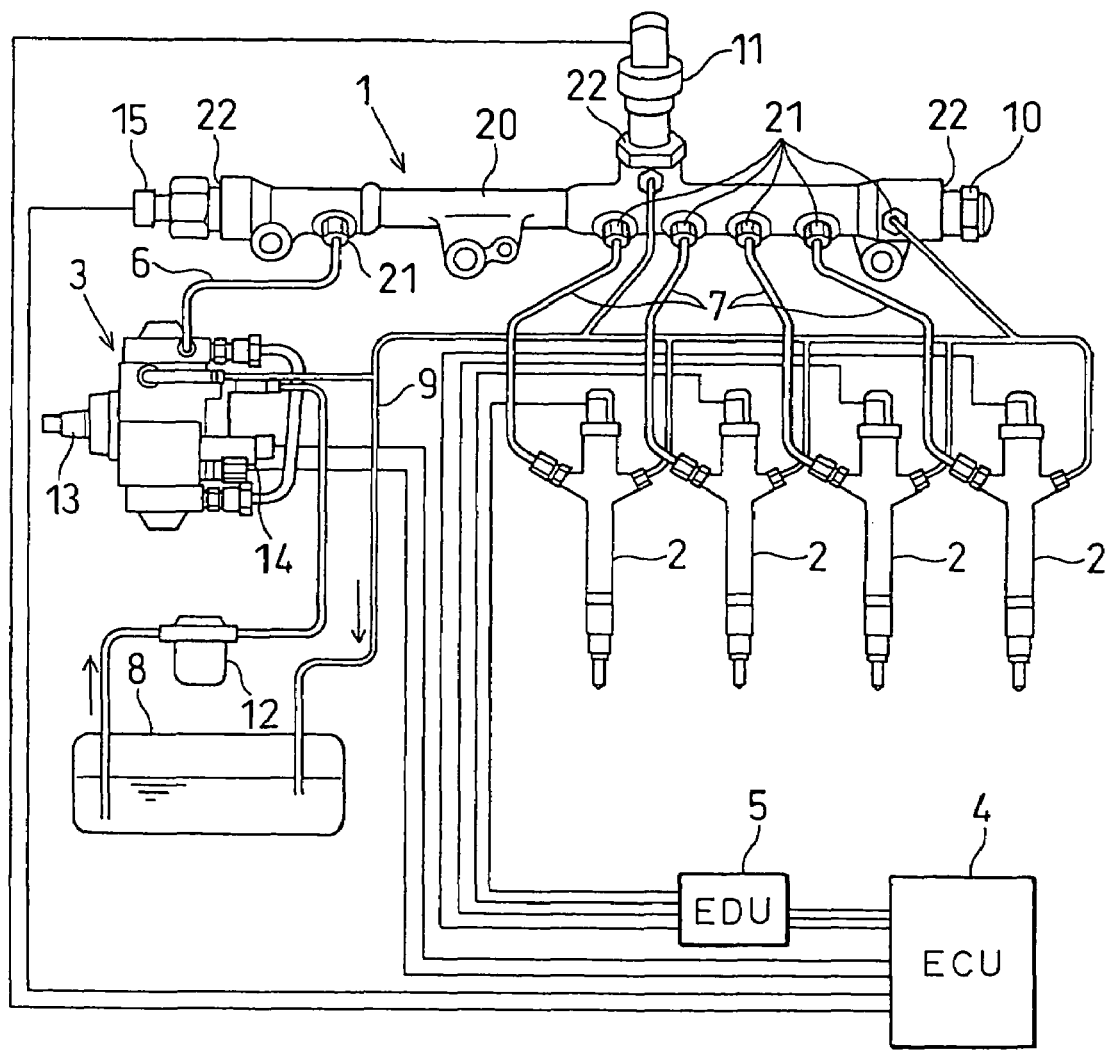
FIG. 3 is a system structure diagram of a common rail type fuel injection system incorporating the pipe joint structure according to the first embodiment.

As shown in FIG. 3, a common rail type fuel injection system, for example, a system of injecting fuel to a four cylinder engine such as a diesel engine (not shown), is composed of a common rail 1, injectors 2, a supply pump 3, ECU 4 (Engine Control Unit), EDU 5 (Engine Driving Unit) and so on.

The common rail 1 is a pressure accumulation vessel in which high pressure fuel to be supplied to the injectors 2 is accumulated. The common rail 1 is connected via a high pressure pump distribution pipe 6 to a discharge port of the supply pump for feeding high pressure fuel thereto through the high pressure pump distribution pipe 6 so that common rail pressure corresponding to a fuel injection pressure is accumulated therein. A plurality of injector distribution pipes 7 are joined to the common rail 1 for supplying high pressure fuel to the respective injectors 2. Details of a pipe joint structure in which the high pressure pump distribution pipe 6 or each of the injector distribution pipes 7 is joined to the common rail 1 are described later.

A pressure limiter 10 is mounted in a relief pipe 9 through which fuel is returned from the common rail 1 to a fuel tank 8. The pressure limiter 10 is a pressure safety valve which is opened when fuel pressure in the common rail 1 exceeds a predetermined value so that the fuel pressure in the common rail 1 is always below the predetermined value.

A pressure reducing valve 11 is mounted on the common rail 1. The pressure reducing valve 11 is opened upon receiving a valve opening instruction signal from ECU 4 so that common rail pressure is quickly reduced through the relief pipe 9. With the pressure reducing valve 11 mounted on the common rail 1, ECU 4 can control quickly to reduce the common rail pressure to pressure responsive to vehicle running conditions.

Each of the injectors 2 is installed in each of cylinders of the engine for injecting fuel to the each of cylinders and connected to each downstream end of the injector distribution pipes 7 which are branched out of the common rail 1. The injector 2 has a fuel injection nozzle for supplying to the cylinder of the engine high pressure fuel accumulated in the common rail 1 and an electromagnetic valve in which a lift of a needle accommodated in the fuel injection nozzle is controlled. Fuel leaked from the injectors 2 is returned to the fuel tank 8 via the relief pipe 9.

The supply pump 3 is a pump for feeding fuel under high pressure to the common rail 1. A feed pump (not shown), through which fuel in the fuel tank 8 is sucked via a filter 12 to the supply pump 3, is provided in the common rail type fuel injection system. The supply pump 3 compresses the fuel sucked by the feed pump and high pressure fuel is delivered to the common rail 1. The feed pump and the supply pump 3 are driven commonly by a camshaft 13. The camshaft 13 is rotatably driven by the engine.

In the supply pump 3, SCV 14, which is a suction control valve, is installed in a fuel passage through which fuel is delivered to a pressure chamber for highly pressurizing fuel. Upon receiving a pump driving signal from ECU 4, SCV 14 is controlled to adjust an amount of fuel to be sucked to the pressure chamber so that a discharge amount of fuel to be delivered under high pressure to the common rail 1 is adjusted. ECU 4 controls SCV 14 in such a manner that the common pressure is regulated to pressure responsive to the vehicle running conditions.

ECU 4 has components (not shown) such as CPU, RAM and ROM and executes various calculation processes based on programs memorized in ROM and signals of sensors (vehicle driving condition signals) read in RAM. ECU 4 executes, for example, the calculation processes for determining a target injection amount, an injection pattern and valve opening and closing timings of each of the injectors 2 applicable to each of the cylinders based on the programs memorized in ROM and the signals of sensors (vehicle driving condition signals) read in RAM.

EDU 5 is a drive circuit through which a valve opening current is applied to each electromagnetic valve of the injectors 2 based on the injector valve opening signals given from ECU 4. As soon as the valve opening current is applied to the electromagnetic valve, high pressure fuel injection to each of the cylinders 2 starts and, when application of the valve opening current to the electromagnetic valve stops, the high pressure fuel injection terminates.

ECU 4 is connected to and receives signals from various sensors, which are means for detecting vehicle driving conditions, such as a pressure sensor 15 for detecting the common rail pressure, an acceleration sensor for detecting opening degree of a throttle valve, a revolution sensor for detecting engine revolution and a temperature sensor for detecting temperature of engine coolant.

The common rail 1 is composed of a pipe shaped common rail body 20 in which extremely high pressure fuel is accumulated, pipe joint bases 21 to which various distribution pipes such as the high pressure pump distribution pipe 6 and the injector distribution pipes 7 are joined, and mounting bases 22 to which various functional parts such as the pressure limiter 10, the pressure reducing valve 11 and the pressure sensor 15 are mounted. The pipe joint bases 21 and the mounting bases 22 are provided in the common rail body 20.

Though a shape of the common rail body 20 shown in FIG. 3 is complicated, the common rail body 20 may be formed in shape of a uniform diameter pipe on which the pipe joint bases 21 are axially arranged. In this case, the common rail body 20 can be manufactured at lower cost because of use of inexpensive simple pipe material.

Figure 1:
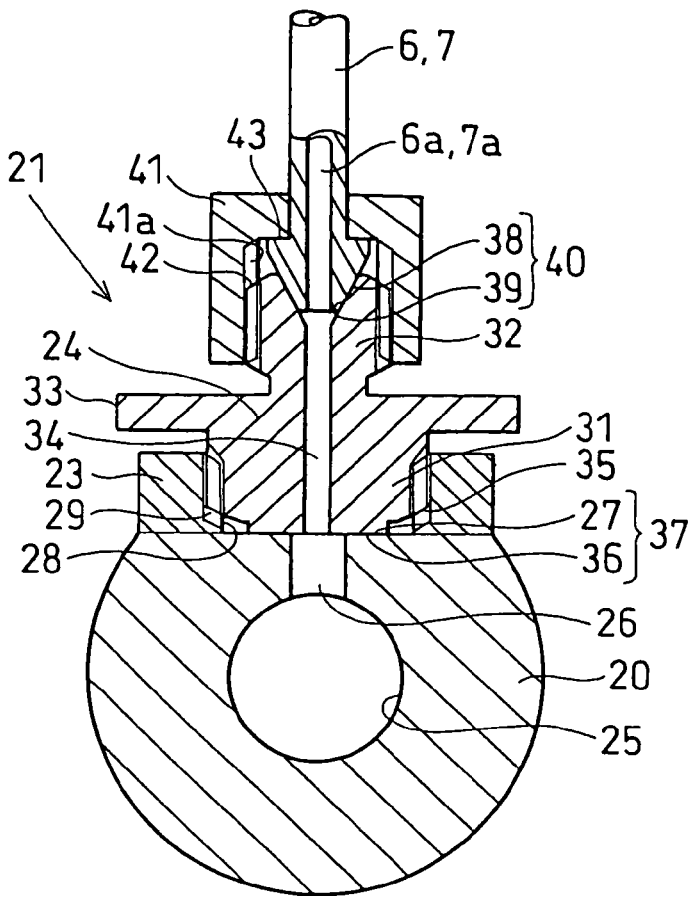
FIG. 1 is across sectional view of a pipe joint structure according to a first embodiment of the present invention.
Figure 2:
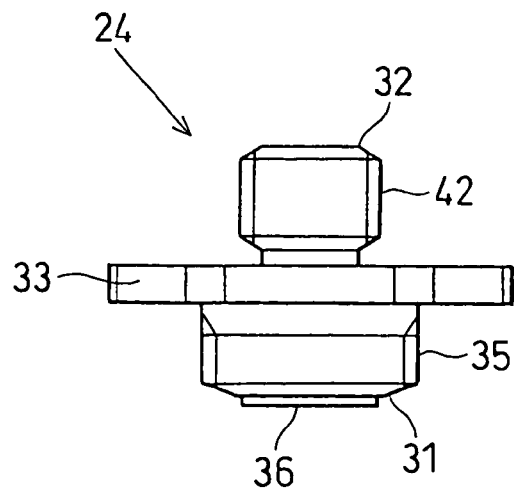
FIG. 2 is an elevation view of a joint member of the pipe joint structure according to the first embodiment.

As shown in FIGS. 1 and 2, each of the pipe joint bases 21 is composed of a joint fitting member 23 fixed to the common rail body 20 (the vessel) by welding and a joint member 24 screw fastened and fixed to the joint fitting member 23. Each of the distribution pipes such as the high pressure pump distribution pipe 6 and the injector distribution pipes 7 (hereinafter called the distribution pipe 6, 7) is connected to the joint member 24.

The common rail body 20 is provided with an axially extending central hollow 25, at a circumferential wall thereof with a plurality of radially extending through-holes 26 axially spaced at given intervals and at an outer circumference thereof with first flat surfaces 27. An end of each of the through-holes 26 is opened to the central hollow 25 and another end thereof is opened to each of the first flat surfaces 27.

The joint fitting member 23 is formed in a ring shape and has an insertion hole 28 whose inner diameter is larger than inner diameter of the through-hole 26. A first screw thread 29 (female screw thread) is formed at an inner circumferential wall of the insertion hole 28. The joint fitting member 23 is bonded by resistance welding and fixed to the first surface so that the insertion hole 28 and the through-hole 26 are positioned in roughly coaxially alignment.

The joint member 24 is provided at a position on an end side thereof with an insertion portion 31 screw fastened to the insertion hole 28 of the joint fitting member 23, a position on another end side thereof with a pipe connection portion 32 to which the distribution pipe 6, 7 is connected, and at an intermediate position thereof with a large diameter hexagonal bolt head portion 33.

The joint member 24 is further provided in a center thereof with a fluid passage extending to penetrate axially center parts of the pipe connection portion 32, the hexagonal bolt head portion 33 and the insertion portion 31 so that the through-hole 26 communicate with an inner passage 6a, 7a of the distribution pipe 6, 7 (the inner passage 6a of the high pressure pump distribution pipe 6 and the inner passage 7a of the injector distribution pipe 7).

The inserting portion 31 is provided at an outer circumference thereof with a second screw thread 35 (male screw thread) screw fastened into the first screw thread 29 of the joint fitting member 23. As the second screw thread 35 is screwed deep into the first screw thread 29, the insertion portion 31 is inserted deep into the insertion hole 28.

The insertion portion 31 is provided at an axial end thereof with a second flat surface 36 surrounding entirely an opening periphery of the fluid passage 34 and coming in contact with the first flat surface 27 of the common rail body 20.

Due to the second screw thread 35 screwed into the first screw thread 29 so that the insertion portion 31 is inserted deep into the insertion hole 28, the second flat surface 36 around the fluid passage 34 is pressed against and in contact with the first flat surface 27 around the through-hole 26 to form a fluid tight main body sealing surface 37 therebetween. Accordingly, the fluid passage 34 opened to the second flat surface 36 communicates with the through-hole 26 opened to the first flat surface 27.

The pipe connection portion 32 is provided at an outer circumference thereof with a pipe mounting screw thread 42 screwed into a pipe mounting female screw thread 41a formed in an inner circumference of a mounting nut 41. Since the pipe mounting screw thread 42 is screwed into the pipe mounting female screw thread 41a in a state that the mounting nut 41 abuts against a step portion 43 at a back of the conical portion 38, the conical portion 38 of the distribution pipe 6, 7 is pressed against and in contact with the conical pressure receiving seat 39 to form a fluid tight pipe sealing surface 40 therebetween.

According to the pipe joint structure mentioned above, the fluid tight sealing surface 40 is formed by pressing the second flat surface 36 of the insertion portion 31 against the first flat surface 27 of the common rail body 20 so that the first and second flat surfaces 27 and 36 come in surface contact with each other. Accordingly, even if the mounting position of the joint fitting member 23 is slightly shifted, the fluid tight sealing surface 37 can be assured without fail.

The pipe joint structure mentioned above has the following advantages.

(1) Since higher dimensional accuracy of the joint fitting member 23 and the common rail body 20 is not required, each manufacturing cost of the joint fitting member 23 and the common rail body 20 can be reduced.

(2) Since it is not required that the mounting position of the joint fitting member 23 on the common rail body 20 is controlled with higher accuracy, the joint fitting member 23 can be bonded to the common rail body 20 by inexpensive bonding means such as resistance welding without using the expensive laser welding. Accordingly, cost of bonding the joint fitting member 23 to the common rail body 20 is reduced.

(3) It is preferable that the common rail body 20, which has to endure extremely higher pressure, is made of material having higher hardness such as middle or high carbon steel. The middle or high carbon steel can be bonded by inexpensive bonding means such as resistance welding but can't be bonded by the expensive laser welding. Since the joint fitting member 23 can be bonded by the resistance welding to the common rail body 20 made of middle or high carbon steel having higher extremely high pressure endurance, more compact body size of the common rail body 20 can be achieved.

Figure 14:
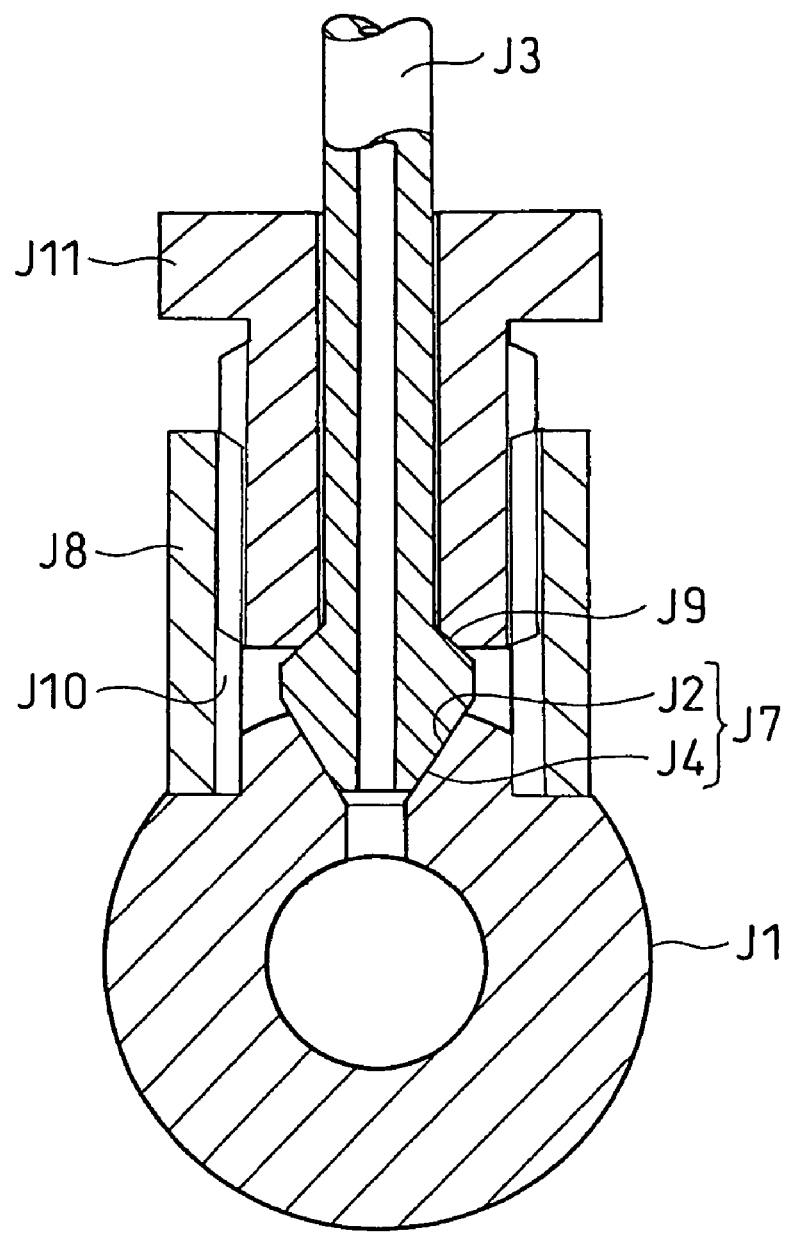
FIG. 14 is a cross sectional view of a conventional pipe joint structure as a prior art.
Figure 15:
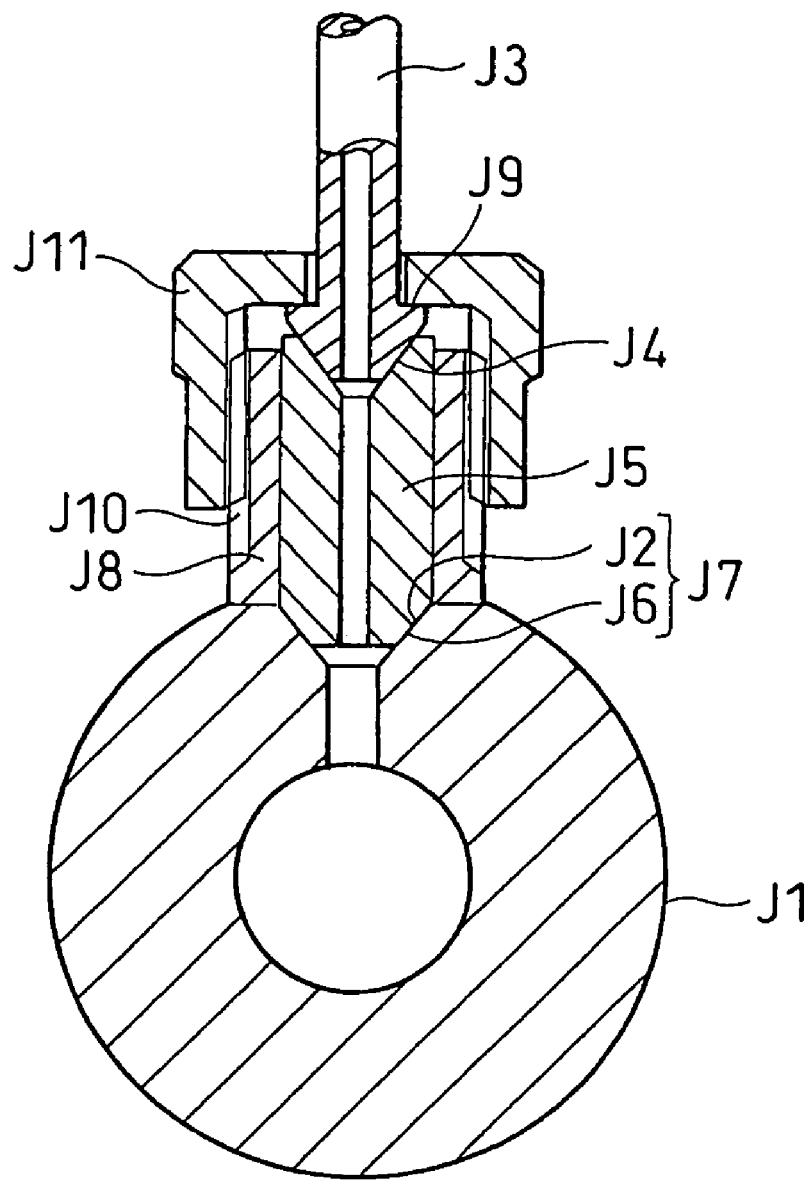
FIG. 15 is a cross sectional view of another conventional pipe joint structure as another prior art.
Figure 16:
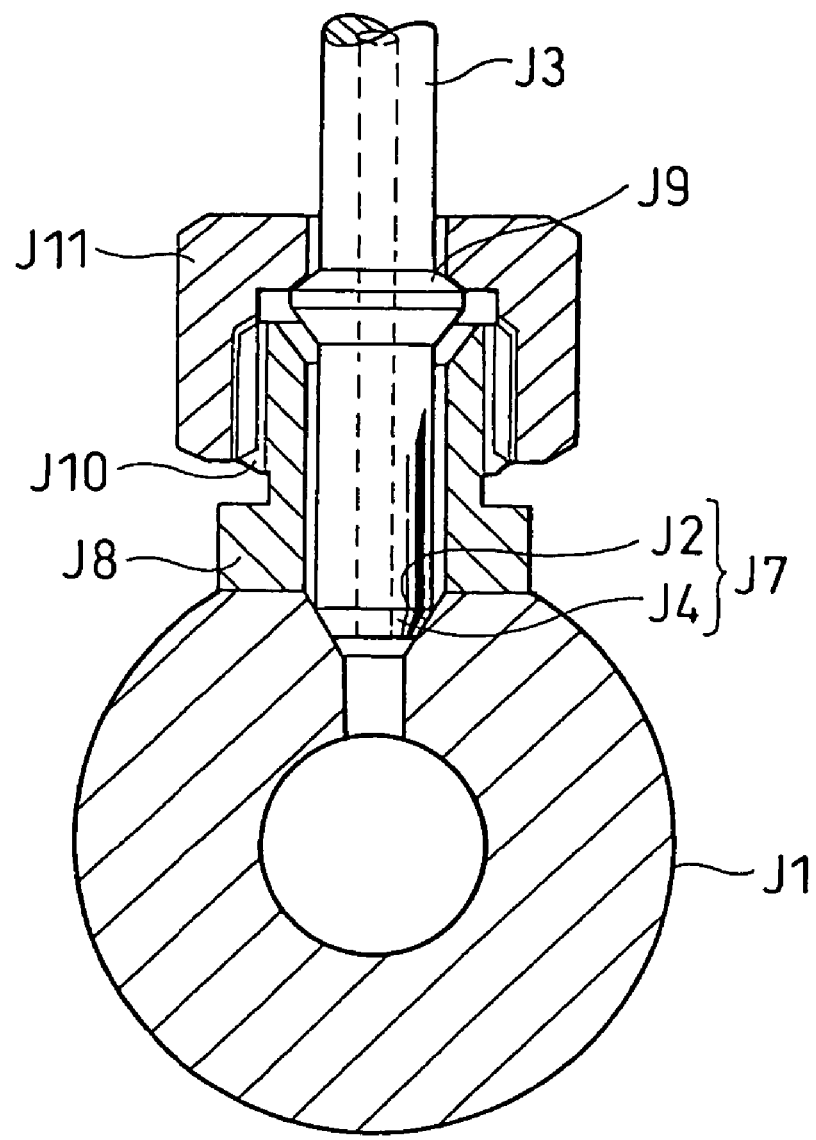
FIG. 16 is a cross-sectional view of a further conventional pipe joint structure as a further prior art.

(4) The joint fitting member 23 is provided in the interior thereof only with the fluid passage 34 and the distributor pipe J3 or the distribution pipe extension cylinder J5 (refer to FIGS. 14 to 16), as disclosed in prior art, is not inserted into the interior of the joint fitting member 23. Accordingly, a smaller outer diameter of the pipe connection portion 32 of the joint member 24, that is, a smaller size (for example, M12) of the pipe mounting screw thread 41a can be employed so that the pipe joint structure is more compact, or strength of joint fitting member 23 may be sufficiently assured due to thicker wall thickness of the joint fitting member 23.

Figure 4:
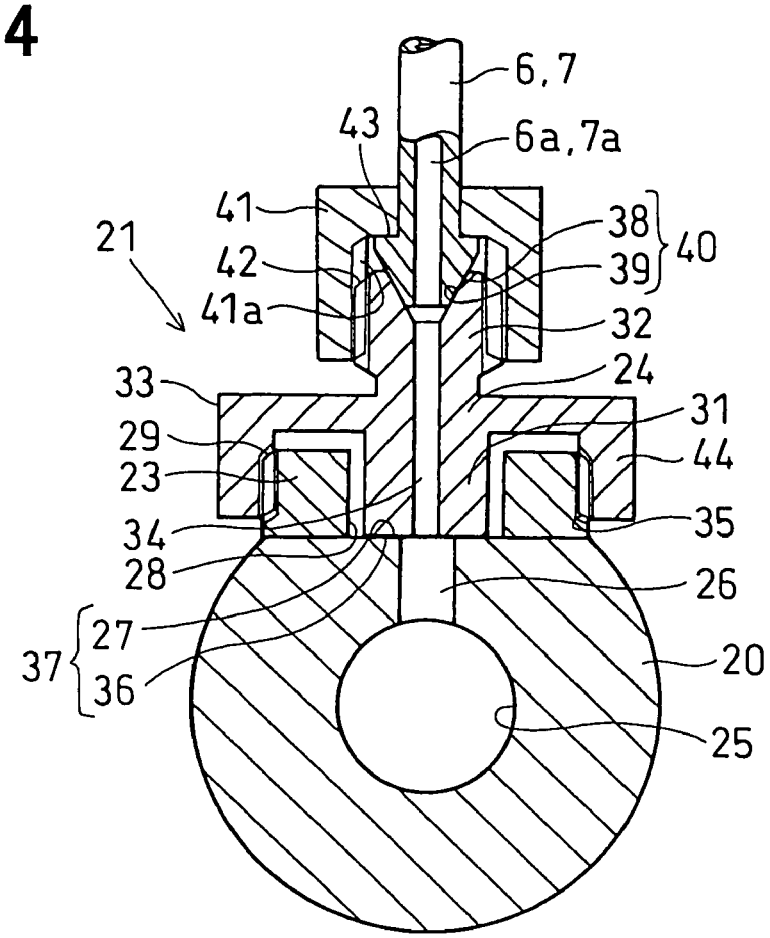
FIG. 4 is a cross sectional view of a pipe joint structure according to a second embodiment of the present invention.
Figure 5:
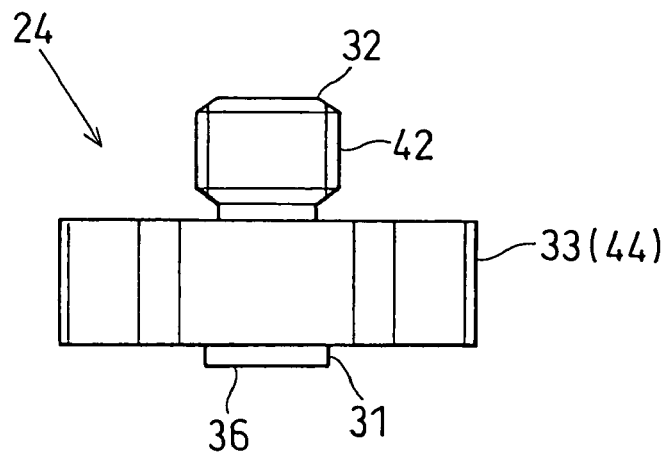
FIG. 5 is an elevation view of a joint member of the pipe joint structure according to the second embodiment.

A second embodiment is described with references to FIGS. 4 and 5. The same reference number as the first embodiment is assigned to the substantially similar functional component in the second and the subsequent embodiments.

According to the second embodiment, the joint fitting member 23 is provided on an outer circumference thereof with the first screw thread 29 (male screw thread), instead of the first screw thread 29, which is the female screw thread, provided in the inner circumference of the insertion hole 28 of the joint fitting member 23 in the first embodiment. Further, the joint member 24 is provided radially outside the joint fitting member 23 and coaxially with the insertion portion 31 with a cylindrical portion 44. The cylindrical portion 44 is provided on an outer circumference thereof with the hexagonal bolt head portion 33 and on an inner circumference thereof with the second screw thread 35 (female screw thread), instead of the second screw thread 35, which is the male screw thread, provided on the outer circumference of the insertion portion 31 in the first embodiment.

Similarly as the first embodiment, the second screw thread 35 is screwed into the first screw thread 29 so that the first and second flat surfaces 27 and 36 come in fluid tight surface contact with each other. The second embodiment has the same advantages as the first embodiment.

Figure 6A:
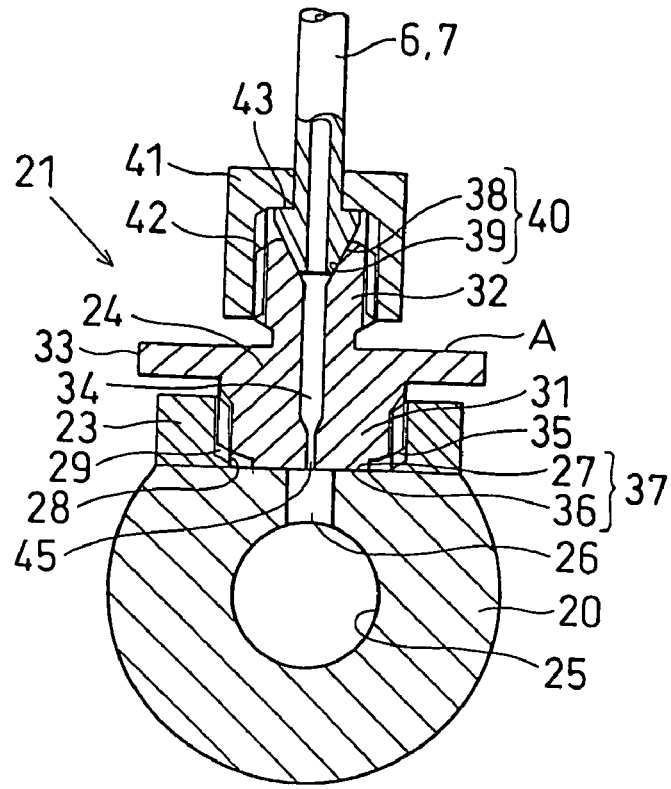
FIGS. 6A and 6B are cross sectional views of pipe joint structures according to a third embodiment of the present invention.
Figure 6B:
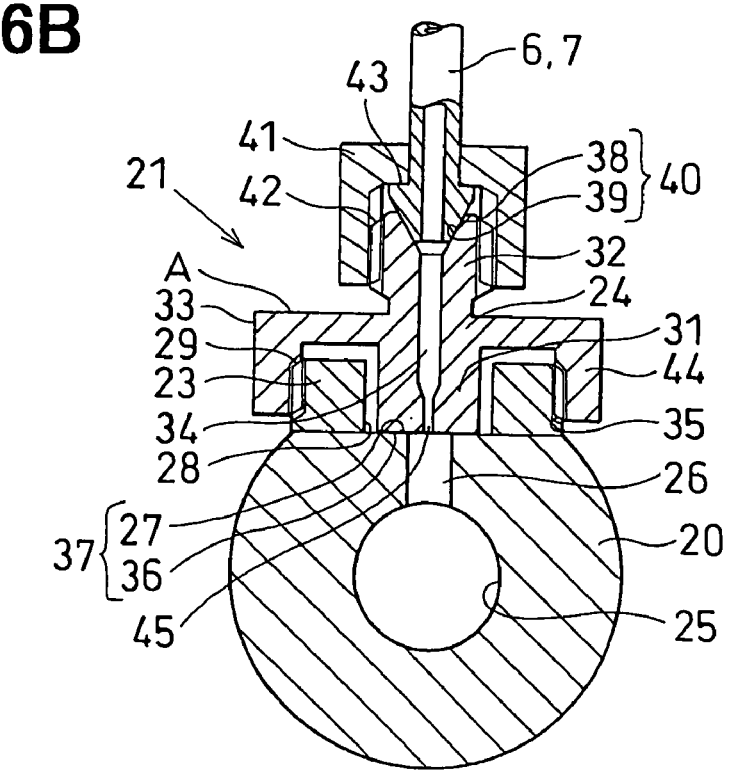

A third embodiment is described with references to FIGS. 6A and 6B.

According to the third embodiment, the joint member 24 is provided inside the fluid passage 34 with an orifice 45. The orifice 45 serves to reduce fluid flow pulsation occurring in particular in the distribution pipe 7 (injector distribution pipe 7). It is not necessary to provide the orifice 45 in the common rail body 20, as shown in conventional pipe joint structure. Further, since the orifice 45 is provided in the joint member 24, the orifice 45 can be easily replaced. In particular, if data of the orifice 45 such as diameter of the orifice 45 are displayed at a visually open position as shown by a mark A in FIGS. 6A and 6B, a larger advantage is given to a maintenance purpose.

A fourth embodiment is described with reference to FIGS. 7 and 8.

Figure 7:
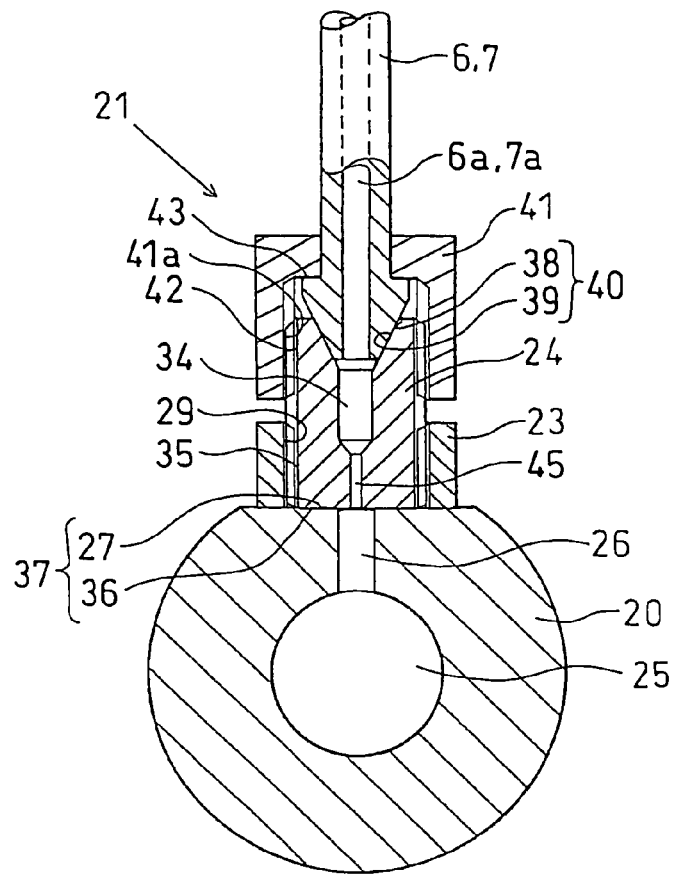
FIG. 7 is a cross sectional view of a pipe joint structure according to a fourth embodiment of the present invention.

As shown in FIG. 7, the joint member 24 according to the fourth embodiment does not have the large hexagonal bolt head portion 33 positioned between the second screw thread 35 and the pipe mounting screw thread 42 as provided in the first embodiment. The hexagonal bolt head portion 33 is used for rotating the joint member 24 so as to assembly the joint member 24 to the joint fitting member 23 in the first embodiment. The joint member 24 according to the fourth embodiment is formed in shape of a column having a uniform outer diameter. The second screw thread 35 and the pipe mounting screw thread 42 have the same screw thread diameter (for example, M12) and continuously provided axially on the outer circumference of the joint member 24. That is, the joint member 24 according to the fourth embodiment is formed in shape of, so called, a stad bolt.

Further, the fluid passage 34, which is provided inside the joint member 24, has the orifice 45 for reducing the fluid flow pulsation generating in the distribution pipe 6, 7. It is not always necessary to provide the orifice 45 in the fluid passage 34 of the joint member 24 to which the high pressure pump distribution pipe is joined. The portions mentioned above are different from those of the first embodiment.

Figure 8:
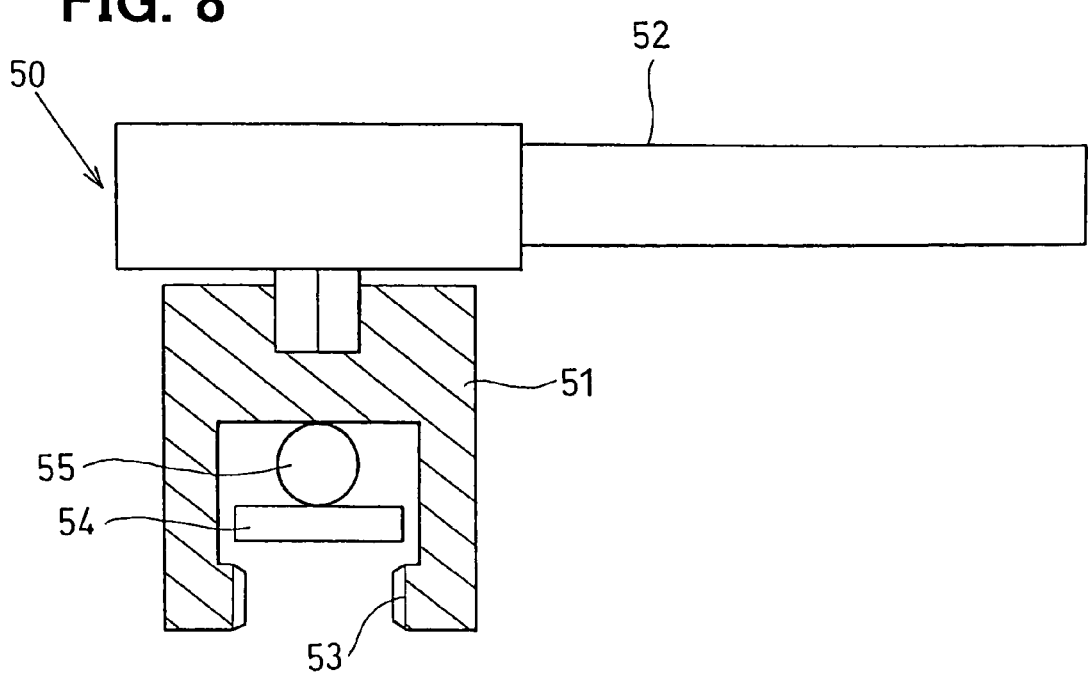
FIG. 8 is a schematic cross sectional view of a stad bolt fastening wrench to be used in the pipe joint structure according to the fourth embodiment.
Figure 9:
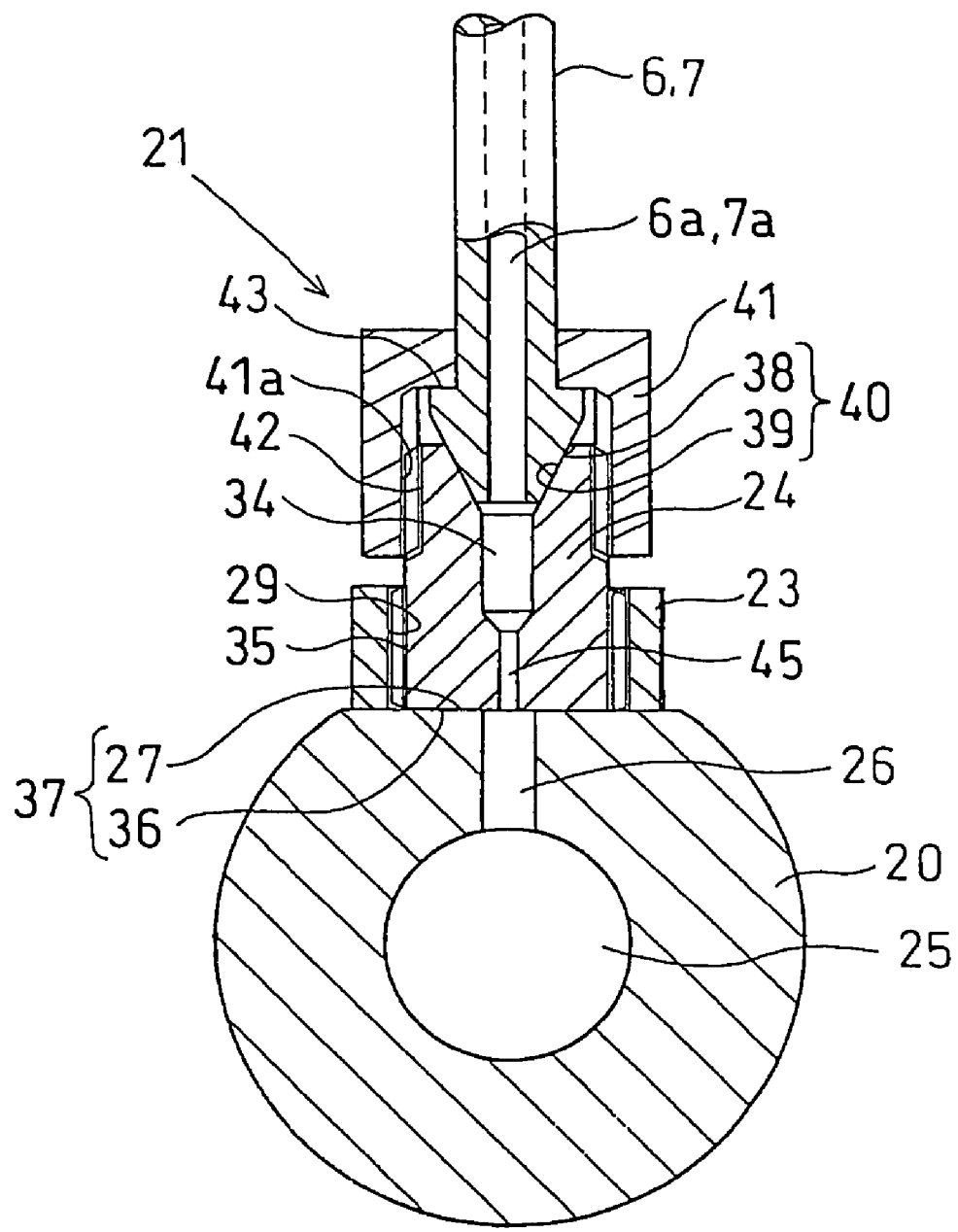
FIG. 9 is a cross sectional view of a pipe joint structure according to a fifth embodiment of the present invention.

As shown in FIG. 8, since the joint member 24 is formed in shape of the bolt, the second screw thread 35 is screwed into the first screw thread 29 by holding an end portion of the joint member 24 on a side of the pipe mounting screw thread 42 and rotating the joint member 24 in use of a wrench 50.

The wrench 50 is a bolt fastening wrench having a box 51 and a tool 52 for rotatably driving the box 51. An inner surface of the box 51 is screw fastened by a given axial length to the pipe mounting screw thread 42 until an inner bottom of the box 51 comes in contact with the end of the joint member 24 on a side of the pipe mounting screw thread 42 and, then, the box 51 is turned by the tool so that a rotating moment is applied to the joint member 24 on a side of the pipe mounting screw thread 42.

Though a ratchet wrench is shown as the tool 52 in FIG. 8, the tool 52 may be an electrically driven automatic tool, which makes it possible to automatically screw the second screw thread 35 into the first screw thread 29.

The box 51 is provided on an inner circumference thereof with a female screw thread 53 to be screwed into the pipe mounting screw thread 42. A plate 54 and a ball 55 are accommodated in an interior of the box 51. The plate 54 is positioned between the female screw thread 53 and the inner bottom of the box 51. The ball 55 is positioned between the plate 54 and the inner bottom of the box 51.

Processes of assembling the joint member 24 to the joint fitting member 23 are shown below.

At first, the female screw thread 53 of the box 51 is screwed by the given length into the pipe mounting screw thread 42 of the joint member 24 until the end of the joint member 24 on a side of the pipe mounting screw thread 42 comes in contact with the inner bottom of the box 51 via the plate 54 and the ball 55.

Then, the box 51 is rotated so as to screw the second screw thread 35 of the joint member 24 into the first screw thread 29 of the joint fitting member 23, until the second flat surface 36 of the joint member 24 is pressed against the first flat surface 27 of the common rail body 20. After the second flat surface 36 comes in contact with the first flat surface 36, a larger rotating moment is applied to the tool 52 for rotatably driving the box 51 so that the second flat surface 36 comes in strictly close contact with the first flat surface 27 to form the fluid tight sealing surface 37 therebetween.

Finally, as the tool 52 is rotated in a direction opposite to screw fastening direction (screw releasing direction), the box 51 is rotated in reverse relative to the pipe mounting screw thread 42 since the ball 55 is in a point contact with and leaves easily from the inner bottom of the box 51 so that the box 51 is easily removed from the pipe mounting screw thread 42.

According to the fourth embodiment, as the joint member 24 does not have the large hexagonal bolt head portion 33 between the second screw thread 35 and the pipe mounting screw thread 42, an axial length of the joint member 24 is shorter so that the pipe joint structure is more compact. Accordingly, a smaller body size of the common rail 1 can be achieved, which results in easier installation of the common rail 1 in an engine room whose installation space is limited.

Further, the shorter axial length of the joint member 24 makes it possible even in the narrow engine space to secure sufficient space for easily connecting the distribution pipe 6, 7 to the joint member 24.

Furthermore, since the hexagonal bolt head portion 33 is not provided in the joint member 24, a maximum diameter of the joint member 24 is smaller so that the pipe joint structure is more compact, which results in a smaller body size of the common rail 1.

Moreover, since the hexagonal bolt head portion 33 is not formed in the joint member 24, even if the joint member 24 is formed by machining, an amount to be cut by machining is smaller so that cost of the joint member 24 is lower, which results in lower cost of the common rail 1 including the pipe joint structure.

Figure 10:
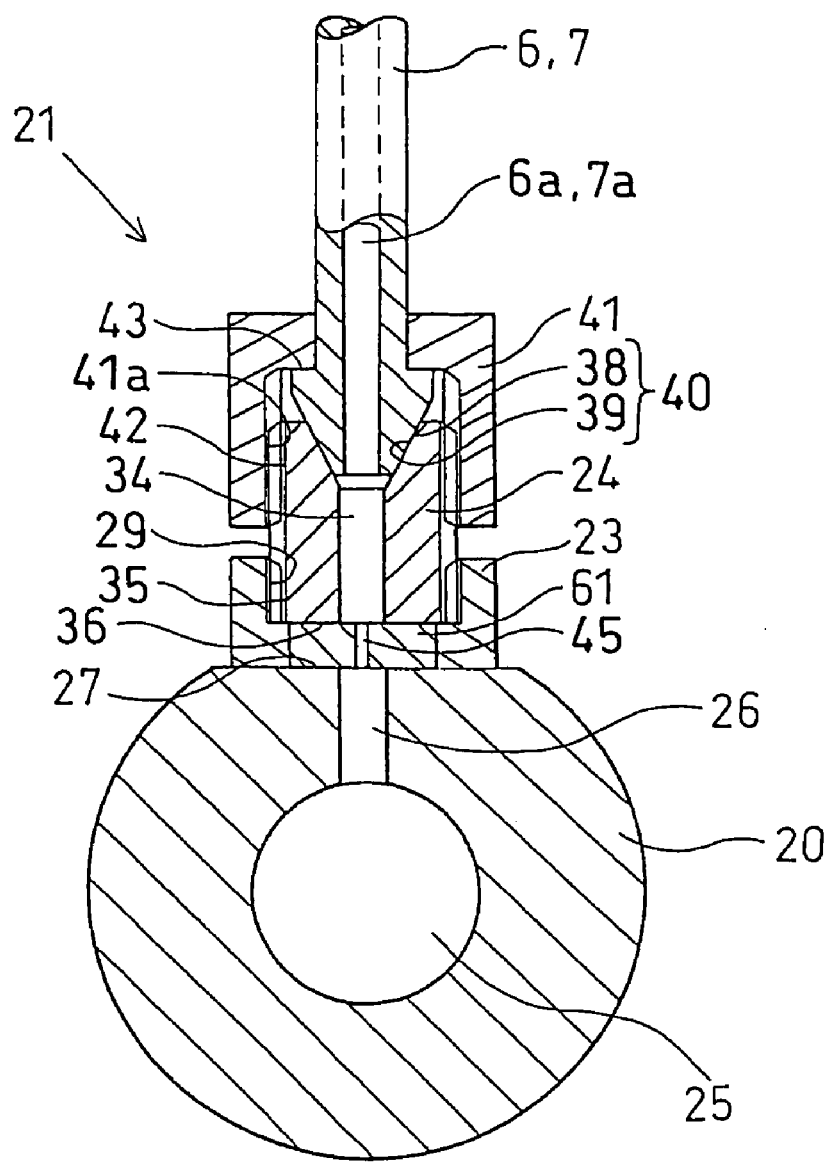
FIG. 10 is across-sectional view of a pipe joint structure according to a sixth embodiment of the present invention.

A fifth embodiment is described with reference to FIG. 10.

The screw thread diameters of the second screw thread 35 and the pipe mounting screw thread 42 are same (for example, M12) in the fourth embodiment. However, according to the fifth embodiment, the screw thread diameter of the second screw thread 35 (for example, M14) is larger than that of the pipe mounting screw thread 42 (for example, M12). The larger screw size of the second screw thread 35 is effective to enlarge an area of surface contact between the first and second flat surfaces 27 and 36. Accordingly, friction between the first and second flat surfaces 27 and 36 more increase so that screw fastening of the joint member 24 to the joint fitting member 23 is hardly released.

A sixth embodiment is described with reference to FIG. 10.

Though the orifice 45 is provided in the joint member 24 in the third, fourth or fifth embodiment, the orifice 45 is provided in an orifice plate 61 (corresponding to a packing plate) sandwiched between the second flat surface 36 of the joint member 24 and the first flat surface 27 of the common rail body 20 according to the sixth embodiment. The orifice plate 61 is a disk plate having a center through-hole through which the fluid passage 34 of the joint member 24 communicates with the through-hole 26 of the common rail body 20. The center through-hole, whose inner diameter is relatively small, serves as the orifice 45. Since the orifice 45 is provided in the orifice plate 45 which is a separate body from the joint member 24, fabrication of the orifice 45 is easier, which results in higher productivity.

It is preferable that the orifice plate 61 is made of material (for example, copper) elastically or resiliently easily deformable upon application of relatively stronger force so as to fluid tightly seal between the first and second flat surfaces 27 and 36. After the orifice plate 61 is assembled in the interior of the joint fitting member 23 bonded to the common rail body 20, the second screw thread 35 of the joint member 24 is screwed into the first screw thread 29 of the joint fitting member 23 so that the second flat surface 36 is pressed via the orifice plate 61 against the first flat surface 27. Accordingly, the orifice plate 61 reliably seals between the joint member 24 and the common rail body 20.

Even if each flatness accuracy of the first and second flat surfaces 27 and 36 is not so high, the orifice plate 61 serves to effectively seal between the joint member 24 and the common rail body 20. The sixth embodiment has the same advantages as the first embodiment.

Figure 11:
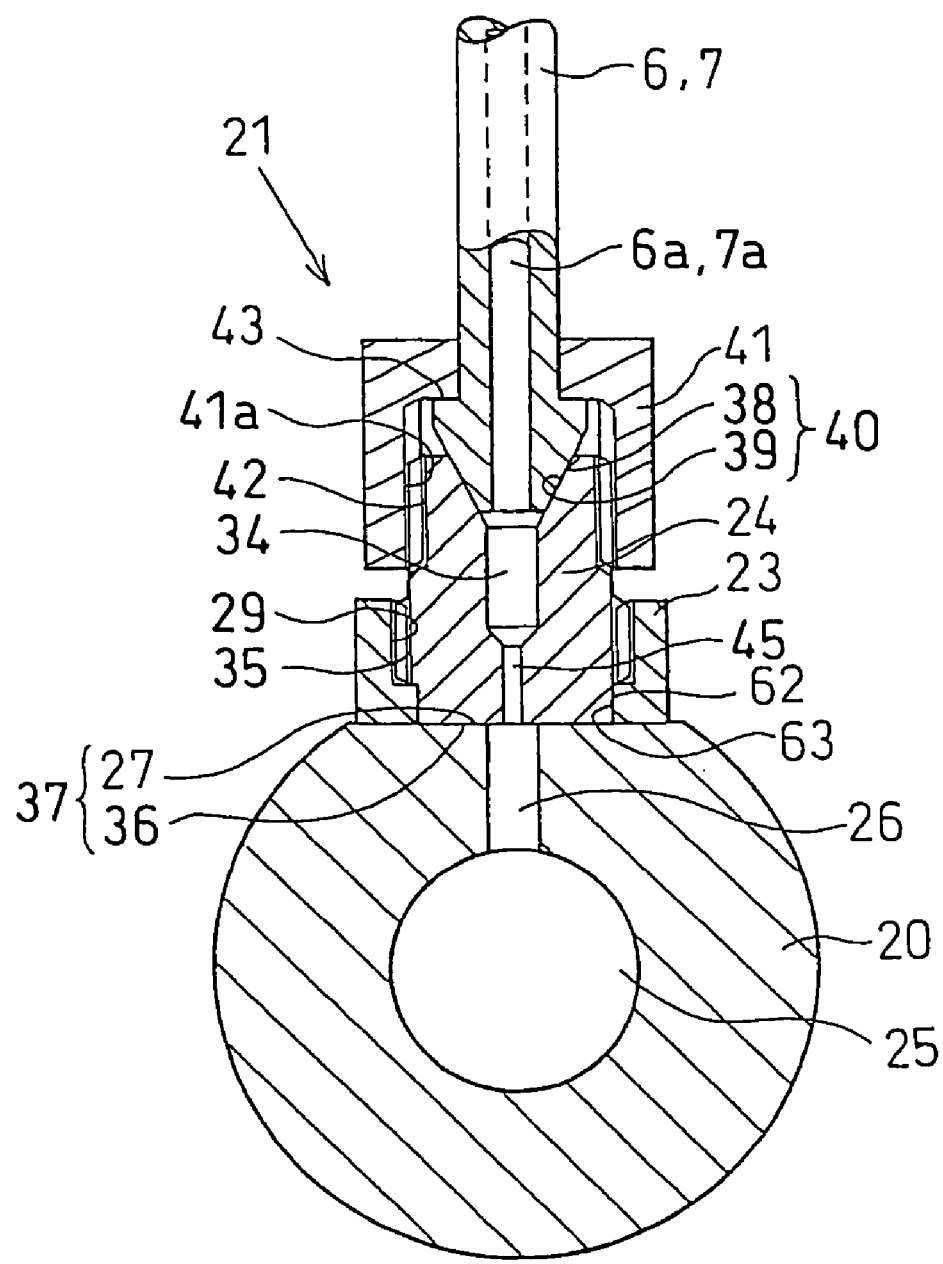
FIG. 11 is a cross-sectional view of a pipe joint structure according to a seventh embodiment of the present invention.

A seventh embodiment is described with reference to FIG. 11.

According to the seventh embodiment, the joint fitting member 23 is provided at an inner circumferential end on a side of the common rail body 20 with an inner diameter guide portion 62 whose inner diameter is slightly smaller than a minimum diameter of the first screw thread 29. The joint member 24 is provided at an outer circumferential end on a side of and beyond the second screw thread 35 with an outer diameter guide portion 63, which is inserted into the inner diameter guide portion 62 with a small clearance therebetween at a final stage when the second screw thread 35 is screwed into the first screw thread 29.

The inner and outer diameter guide portions 62 and 63 serves to secure more accurate position of the joint member 24 relative to the joint fitting member 23.

Figure 12A:
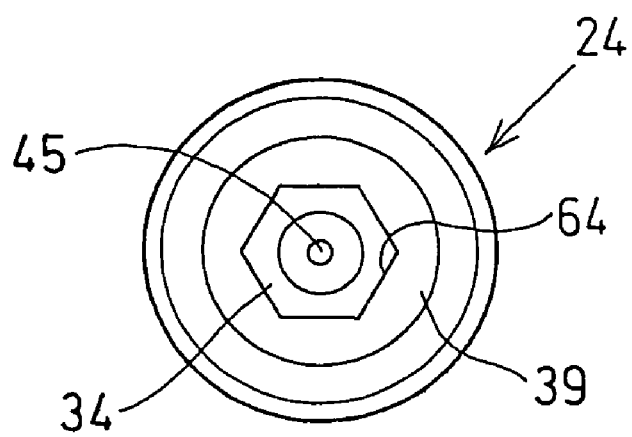
FIG. 12A is a top view of a joint member of a pipe joint structure according to an eighth embodiment of the present invention.
Figure 12B:
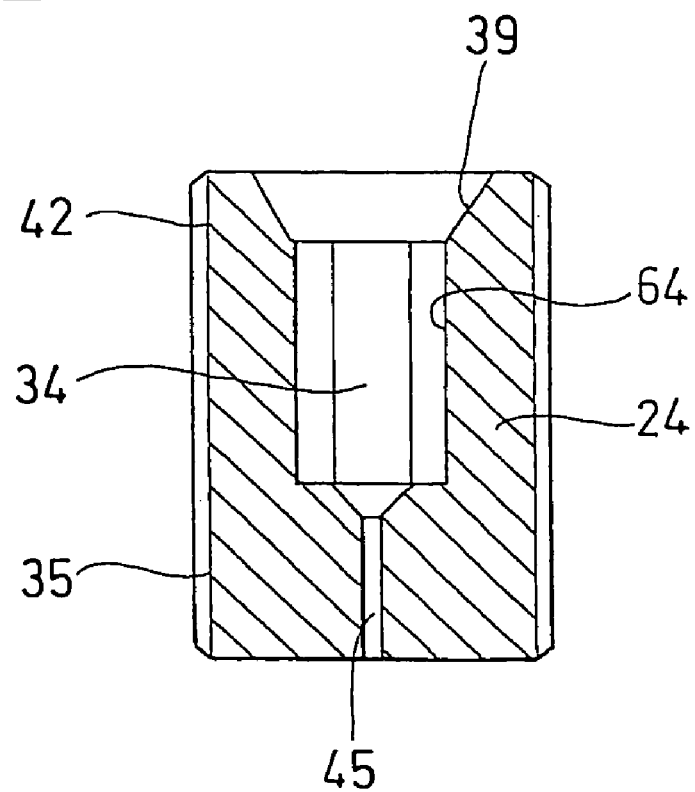
FIG. 12B is a cross sectional view of the joint member of FIG. 12A.

A eighth embodiment is described with reference to FIGS. 12A and 12B.

In the fourth embodiment, the second screw thread 35 is screwed into the first screw thread 29 by rotating the joint member 24 relative to the joint fitting member 23 in a state that a part of the pipe mounting screw thread 42 is held by the bolt fastening wrench 50. However, according to the eighth embodiment, the fluid passage 34 of the joint member 24 is provided at a position immediately adjacent to the conical pressure receiving seat 39 with a hexagonal hole 64 as shown in FIGS. 12A and 12B. After a hexagonal wrench (not shown), whose external form has a hexagonal pillar shape, is inserted into the hexagonal hole 64, the hexagonal wrench is rotated to give rotational moment to the joint member 24. Without providing the hexagonal bolt head portion 33 formed at the outer circumference of the joint member 24 between the second screw thread 35 and the pipe mounting screw thread 42, the joint member 24 can be rigidly screw fastened to the joint fitting member 23 by turning the hexagonal wrench inserted into the hexagonal hole 64.

Figure 13A:
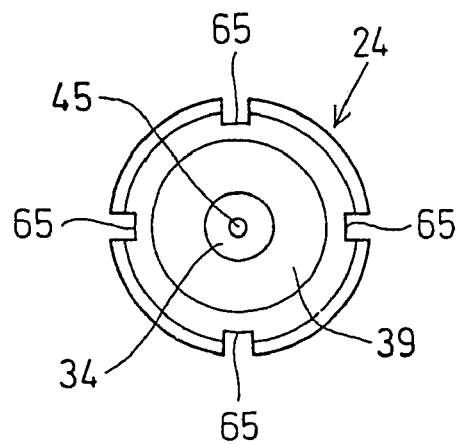
FIG. 13A is a top view of a joint member of a pipe joint structure according to a ninth embodiment of the present invention.
Figure 13B:
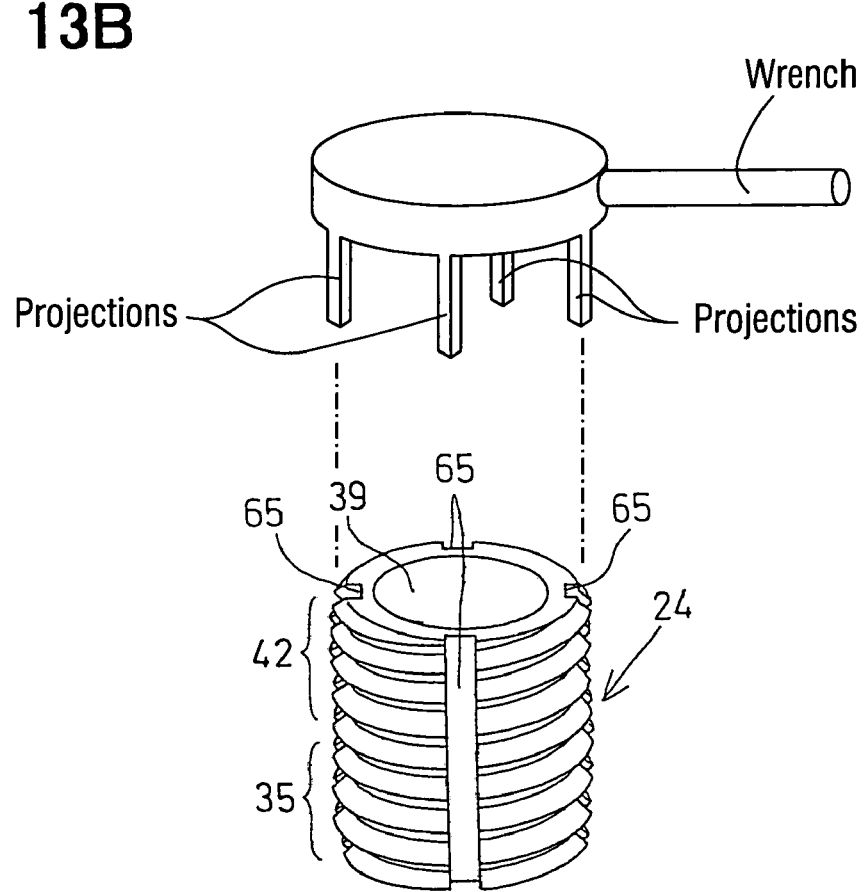
FIG. 13B is a perspective view of the joint member of FIG. 13A and an engagement wrench.

A ninth embodiment is described with references to FIGS. 13A and 13B.

According to the ninth embodiment, the joint member 24 is provided on an outer circumference thereof with a plurality of wrench grooves 65 spaced circumferentially at given intervals and extending axially so as to cross the pipe mounting screw thread 42, as shown in FIGS. 13A and 13B. By rotating a groove engagement wrench having a plurality of projections each of which is inserted into and engaged with each of the wrench grooves 65, rotational moment is applied to the joint member 24, the joint member 24 can be rigidly screw fastened to the joint fitting member 23 without providing the hexagonal bolt head portion 33 formed at the outer circumference of the joint member 24 between the second screw thread 35 and the pipe mounting screw thread 42.

The embodiments mentioned above show examples in which the orifice 45 is provided in the joint member 24 to which the injector distribution pipe 7 is joined or provided in the orifice plate 61 sandwiched between the joint member 24 and the common rail body 20. However, the orifice 45 is not always essential to achieve the pipe joint structure of the present invention.

In the embodiments mentioned above, though the joint fitting member 23 is bonded to the common rail body 20, as an example, by the resistance welding, the joint fitting member 23 may be bonded to the common rail body 20 by any bonding means (for example, by blazing).

The embodiments mentioned above show an example of the pipe joint structure in which the distribution pipe 6, 7 is connected to the common rail 20 (vessel). However, the present invention may be applied to a pipe joint structure in which a pipe (for example, refrigerant pipe) is connected to a vessel (for example, one of parts constituting a refrigeration cycle) The fluid flowing in the pipe is not limited to liquid fuel but may be the other liquid or gas.

The pipe joint structure may have a sealing material such as a packing sandwiched between the joint member 24 and the common rail body 20 to ensure the fluid tight sealing therebetween.

What is claimed is:

1. A pipe joint structure comprising:
    a vessel provided at an outer circumference with a first flat surface and at a circumferential wall with a through-hole having one end opened to the first flat surface and another end opened to an interior of the vessel;
    a joint fitting member having an interior insertion hole diameter larger than the diameter of the through-hole and a first screw thread at an inner circumferential wall or an outer circumferential wall, the joint fitting member being bonded to the vessel so that the first flat surface is positioned radially inside the insertion hole and surrounds an entire outer periphery of the through-hole opened to the first flat surface;
    a joint member provided with an insertion portion having (a) a second flat surface formed at an end, (b) a pipe connection portion having a conical pressure receiving seat formed at another end, and (c) a pipe mounting screw thread at an outer circumference, the insertion portion and the pipe connection portion being connected by an internal fluid passage with one end opened in the second flat surface and another end opened to the conical pressure receiving seat;
    a distribution pipe provided at an end thereof with a conical portion; and
    a mounting nut fastened into the pipe mounting screw thread so that the conical portion is pressed against the conical pressure receiving seat,
    wherein the joint member is further provided at a position inside the inner circumferential wall of the insertion hole or a position outside the outer circumferential wall of the joint fitting member with a second screw thread screwed with the first screw thread so that the insertion portion is inserted into the insertion hole so that the second flat surface is pressed against and in fluid tight contact with the first flat surface while the fluid passage communicates with the through-hole.

2. A pipe joint structure as in claim 1, wherein the first screw thread is a female thread formed on the inner circumferential wall of the insertion hole and the second screw thread is a male thread formed on an outer circumference of the insertion portion.

3. A pipe joint structure as in claim 1, wherein the joint member is further provided outside the outer circumferential wall of the joint fitting member with a cylindrical portion, and, further, wherein the first screw thread is a male thread formed on the outer circumferential wall of the joint fitting member and the second screw thread is a female thread formed on an inner circumference of the cylindrical portion of the joint member.

4. A pipe joint structure as in claim 1, wherein the vessel is a common rail body for accumulating fuel in a common rail fuel injection device.

5. A pipe joint structure as in claim 4, wherein the fluid passage formed in the joint member has an orifice, which serves to reduce fluid flow pulsation generating in the distribution pipe.

6. A pipe joint structure comprising:

a vessel provided at an outer circumference with a first flat surface and at a circumferential wall with a through-hole having one end opened to the first flat surface and another end opened to an interior of the vessel;

a joint fitting member having an interior insertion hole diameter larger than the diameter of the through-hole and a first screw thread at an inner circumferential wall or an outer circumferential wall, the joint fitting member being bonded to the vessel so that the first flat surface is positioned radially inside the insertion hole and surrounds an entire outer periphery of the through-hole opened to the first flat surface;

a joint member provided with an insertion portion having (a) a second flat surface formed at an end, (b) a pipe connection portion having a conical pressure receiving seat formed at another end, and (c) a pipe mounting screw thread at an outer circumference, the insertion portion and the pipe connection portion being connected by an internal fluid passage with one end opened in the second flat surface and another end opened to the conical pressure receiving seat;

a distribution pipe provided at an end thereof with a conical portion; and a mounting nut fastened into the pipe mounting screw thread so that the conical portion is pressed against the conical pressure receiving seat, wherein the joint member is further provided at a position inside the inner circumferential wall of the insertion hole or a position outside the outer circumferential wall of the joint fitting member with a second screw thread screwed with the first screw thread whereby the insertion portion is inserted into the insertion hole so that the second flat surface communicates with the through-hole via a packing plate having a center packing through-hole constituting a part of the fluid passage, wherein the packing plate is disposed between the first and second flat surfaces so that the second flat surface is pressed against and in fluid tight contact with the packing plate which is in turn also pressed against and in fluid tight contact with the first flat surface.

7. A pipe joint structure as in claim 1, wherein a part of the fluid passage positioned in the pipe connection portion immediately adjacent to the conical pressure receiving seat constitutes a hexagonal hole.

8. A pipe joint structure as in claim 1, wherein the outer circumference of the pipe connection portion is provided with a plurality of grooves spaced circumferentially at given intervals and extending axially so as to cross the pipe mounting screw thread.

9. A method of assembling the joint member to the joint fitting member in the pipe joint structure according to claim 1, said method comprising:

holding an end of the pipe connection portion and a part of its outer circumference on which the pipe mounting screw thread is provided; and rotating the joint member relative to the joint fitting member so as to screw the second screw thread into the first screw thread so that the insertion portion is inserted into the insertion hole until the second flat surface is pressed against and in fluid tight contact with the first flat surface.

10. A method of assembling the joint member to the joint fitting member in the pipe joint structure according to claim 9 using a bolt fastening wrench having a box and a tool for rotatably driving the box, wherein an inner surface of the box is a screw fastened to the pipe mounting screw thread until an inner bottom of the box comes in contact with the end of the pipe connection portion so that the end of the pipe connection portion and the outer circumference thereof on a side of the conical pressure receiving seat is held by the box and, further, wherein the box is turned by the tool so as to apply a rotating moment to the pipe connection portion so that the joint member is rotated relative to the joint fitting member so as to screw the second screw thread into the first screw thread.

11. A method of assembling the joint member to the joint fitting member in the pipe joint structure according to claim 7 using a wrench, said method comprising:

inserting the wrench into the hexagonal hole; and
rotating the wrench so that rotational moment is applied to the pipe connection portion.

12. A method of assembling the joint member to the joint fitting member in the pipe joint structure according to claim 8 using a wrench having a plurality of projections, comprising steps of:

inserting the projections of the wrench into the plurality of grooves; and
rotating the wrench so that rotational moment is applied to the pipe connection portion.

* * * * *